(12) United States Patent
Sethi et al.

(10) Patent No.: US 11,321,446 B2
(45) Date of Patent: May 3, 2022

(54) SYSTEM AND METHOD TO ENSURE SECURE AND AUTOMATIC SYNCHRONIZATION OF CREDENTIALS ACROSS DEVICES

(71) Applicant: Dell Products L.P., Round Rock, TX (US)

(72) Inventors: Parminder Singh Sethi, Ludhiana (IN); Anshul Saxena, Bareilly (IN); Vamsi Krishna Tadikamalla, Chennai (IN)

(73) Assignee: Dell Products L.P., Round Rock, TX (US)

( * ) Notice: Subject to any disclaimer, the term of this patent is extended or adjusted under 35 U.S.C. 154(b) by 344 days.

(21) Appl. No.: 16/715,802

(22) Filed: Dec. 16, 2019

(65) Prior Publication Data

US 2021/0182377 A1 Jun. 17, 2021

(51) Int. Cl.
*G06F 21/00* (2013.01)
*G06F 21/45* (2013.01)
*H04L 29/06* (2006.01)

(52) U.S. Cl.
CPC .......... *G06F 21/45* (2013.01); *H04L 63/0838* (2013.01); *H04L 63/20* (2013.01)

(58) Field of Classification Search
CPC ..... G06F 21/45; G06F 21/64; H04L 63/0838; H04L 63/20
See application file for complete search history.

(56) References Cited

U.S. PATENT DOCUMENTS

| | | | |
|---|---|---|---|
| 9,106,645 B1* | 8/2015 | Vadlamani | G06F 1/14 |
| 9,270,655 B1* | 2/2016 | Juels | H04L 63/083 |
| 9,503,452 B1* | 11/2016 | Kumar | H04L 67/306 |
| 10,110,600 B1* | 10/2018 | Simca | H04L 63/08 |
| 2007/0130463 A1* | 6/2007 | Law | G06F 21/41 |
| | | | 713/168 |
| 2008/0022379 A1* | 1/2008 | Wray | G06F 21/604 |
| | | | 726/6 |
| 2010/0095356 A1* | 4/2010 | Han | H04L 63/20 |
| | | | 726/4 |
| 2013/0014236 A1* | 1/2013 | Bingell | G06F 21/45 |
| | | | 726/6 |
| 2016/0034684 A1* | 2/2016 | Aguilar-Macias | |
| | | | H04L 63/0815 |
| | | | 726/6 |
| 2017/0148009 A1* | 5/2017 | Perez Lafuente | H04L 63/0846 |

(Continued)

FOREIGN PATENT DOCUMENTS

KR 20150095872 A * 8/2015 ........... H04L 63/065

OTHER PUBLICATIONS

Google, "Sync Passwords across Your Devices," Google Account Help Center, https://support.google.com/accounts/answer/6197437?co=GENIE.Platform%3DDesktop&hl=en, Nov. 21, 2019, 2 pages.

(Continued)

*Primary Examiner* — John B King (74) *Attorney, Agent, or Firm* — Ryan, Mason & Lewis, LLP (57) ABSTRACT

An access credential is modified at one device, wherein the device is part of a secure private network of multiple devices. Each other device in the secure private network receives notification of the modification. The credential modification is implemented when at least a subset of the other devices each accept the credential modification.

20 Claims, 8 Drawing Sheets

(56) References Cited

U.S. PATENT DOCUMENTS

| | | | | |
|---|---|---|---|---|
| 2018/0006883 A1* | 1/2018 | Melliere | | H04L 67/34 |
| 2018/0083826 A1* | 3/2018 | Wilson | | G06F 21/50 |
| 2018/0176195 A1* | 6/2018 | Pangam | | H04L 63/06 |
| 2018/0375886 A1* | 12/2018 | Kirti | | H04L 41/28 |
| 2020/0187004 A1* | 6/2020 | Reimer | | H04L 63/0815 |

OTHER PUBLICATIONS

Google, "Automatic OAuth 2.0 Token Revocation upon Password Change," G Suite Admin Help Center, https://support.google.com/a/answer/6328616?hl=en, Nov. 21, 2019, 2 pages.

J. Frankenfield, Investopedia, "Blockchain-as-a-Service (BaaS)," https://www.investopedia.com/terms/b/blockchainasaservice-baas.asp, May 17, 2018, 8 pages.

L. Fortney, Investopedia, "Blockchain Explained," https://www.investopedia.com/terms/b/blockchain.asp, Nov. 26, 2019, 23 pages.

* cited by examiner

```
Sample Rule Execution Set

{
  "devicePriority": {
    1: "uuid",
    2: "uuid2",
    3: "uuid3",
  },
  "deviceContribution": {
    "uuid": 30,
    "uuid2": 40,
    "uuid3": 35,
  },
  "MinAcceptanceCriteria": 75%
}
```

SYSTEM AND METHOD TO ENSURE SECURE AND AUTOMATIC SYNCHRONIZATION OF CREDENTIALS ACROSS DEVICES

FIELD

The field relates generally to information processing systems, and more particularly to techniques for managing credentials across multiple user devices in such information processing systems.

BACKGROUND

Surveys claim that about 55 percent of online adults are multi-device users and about 35 percent of these users own 3-4 devices. When the credentials (e.g., account username and/or account password) for an application are updated from one of the devices owned by the user, the access to the application from their other devices would fail until they manually authenticate their access with the new credentials. Also, if the credentials are modified from an unknown source, the user's information can be misused or the user may completely loose access to their own information.

By way of one example, assume a user accesses their account for an application, such as an online content streaming service, from multiple user devices including two laptops, a smartphone, and a desktop. Further assume that the user receives an email notification that the account password has been modified. Unfortunately, the user does not notice the email notification and continues to use the account. Further, the user fails to realize that the devices have automatically been updated with the new password. After a few days, the user is abruptly locked out of the account from all the four user devices. The user then notices the email notification from the content streaming service regarding the password change and also another notification stating his account username has been changed. When the user contacts customer support for the content streaming service, they too are helpless in reviving the account. The user looses the account along with the saved credit/debit card information and other personal details. Thus, existing credential management techniques for a user of multiple devices pose significant challenges.

SUMMARY

Embodiments of the invention provide techniques for improved management of credentials across multiple user devices by ensuring security and automatic synchronization of credentials across the multiple user devices.

For example, in one illustrative embodiment, a method comprises the following steps. An access credential is modified at one device, wherein the device is part of a secure private network of multiple devices. Each other device in the secure private network receives notification of the modification. The credential modification is implemented when at least a subset of the other devices each accept the credential modification.

Advantageously, illustrative embodiments provide systems and methodologies that ensure that malicious actors are unable to modify access credentials of a user without the user giving express permission. For example, illustrative embodiments utilize a private blockchain network and a rule execution set to manage credentials.

These and other features and advantages of the invention will become more readily apparent from the accompanying drawings and the following detailed description.

DETAILED DESCRIPTION

Illustrative embodiments may be described herein with reference to exemplary information processing systems such as, but not limited to, computing environments, cloud infrastructure, data repositories, data centers, data processing systems, computing systems, data storage systems and associated servers, computers, storage units and devices and other processing and computing devices. It is to be appreciated, however, that embodiments of the invention are not restricted to use with the particular illustrative system and device configurations shown. Moreover, the phrases "information processing system," "cloud environment," "cloud computing platform," "cloud infrastructure," "data repository," "data center," "data rocessin system," "computing system," "data storage system," "computing environment," and the like as used herein are intended to be broadly construed, so as to encompass, for example, any arrangement of one or more processing devices.

As mentioned in the background section above, when application credentials are modified from an unknown source, the user's information can be misused or the user may completely loose access to their own information. By way of another example of the issue, consider an existing automatic access token revocation method for a cloud-based application hosting service provider that occurs upon password change. The cloud-based application hosting service provider uses this method to manage password updates for applications accessed from multiple devices. In this existing method, when the password for an application is updated from one device, it is stored in a datacenter of the cloud-based application hosting service provider and a new access token is automatically created. Also, a two-step verification process alerts the user of any such action, e.g., the user gets an email notification about the change. The main risk involved in this process is that the user's information is stored locally on the device and also in the datacenter of the cloud-based application hosting service provider. So, when the credentials are illegally modified in the service provider database, the user looses access to his application by no fault of his own. Also, if one or more of the user's devices can be accessed by the source of the threat, the user looses total control of his information without notice.

Illustrative embodiments overcome the above and other credential management drawbacks by ensuring security and automatic synchronization of credentials across multiple user devices. It is to be appreciated that the term "credentials" as used herein is intended to illustratively refer to any information or data objects used by a user to gain access to a system, service, application and/or the like. Examples of credentials include, but are not limited to, usernames, passwords, access tokens, etc. Further, the term "device" as used herein is intended to illustratively refer to any computing or processing component, module, system, etc. that enables a user to communicate with the system, service, application and/or the like to which the user seeks access. Examples of devices include, but are not limited to, laptops, smartphones, desktops, tablets, etc. Still further, the term "user" as used herein is intended to illustratively refer to an individual or set of individuals and/or a system or a set of systems. Thus, for example, the improved credential management techniques described herein can be implemented in accordance with a human accessing an application, a system accessing an application, and/or a combination thereof.

Figure 1A:
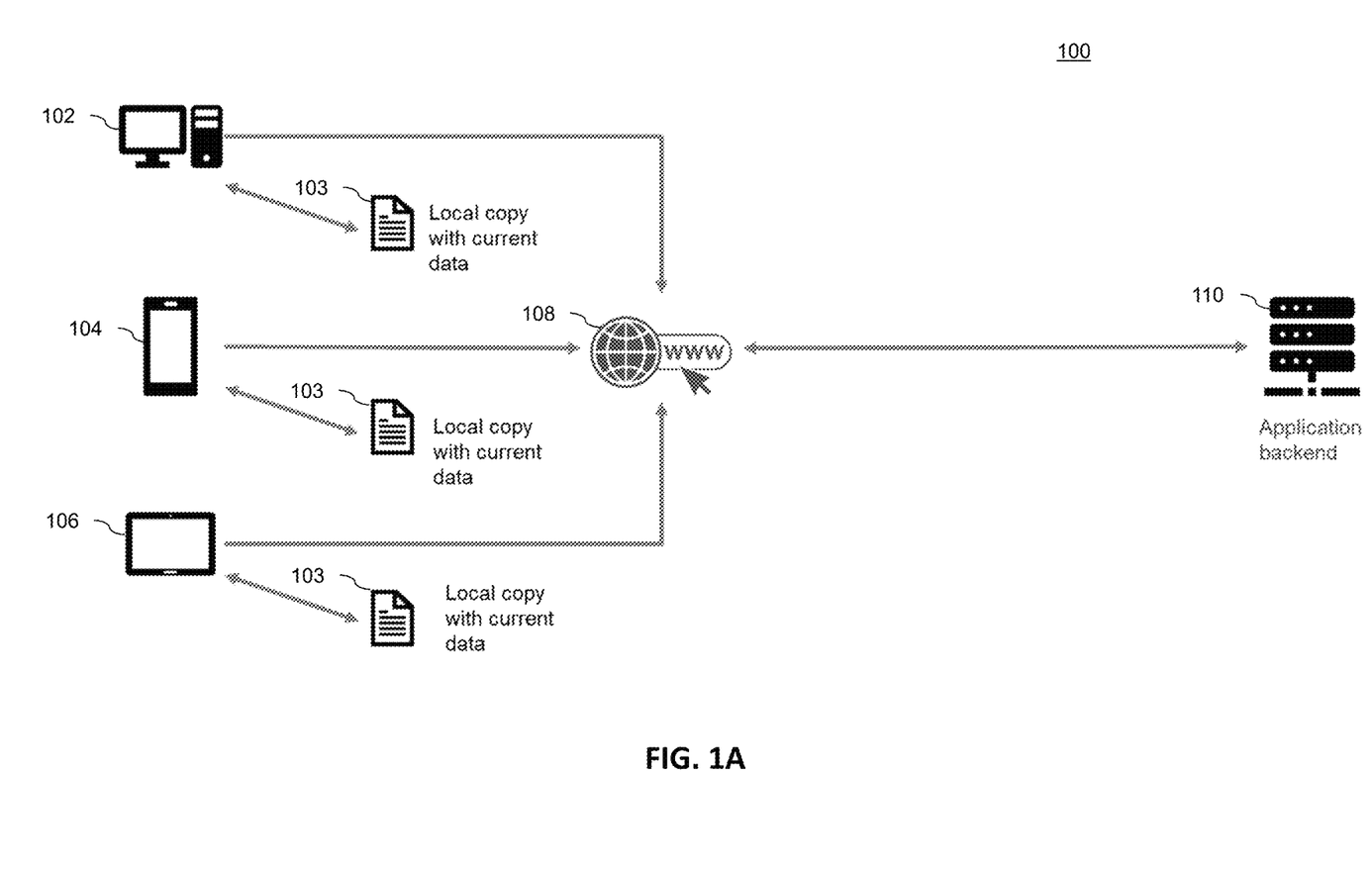
FIGS. 1A and 1B depict an information processing system with application credential management for multiple user devices.
Figure 1B:
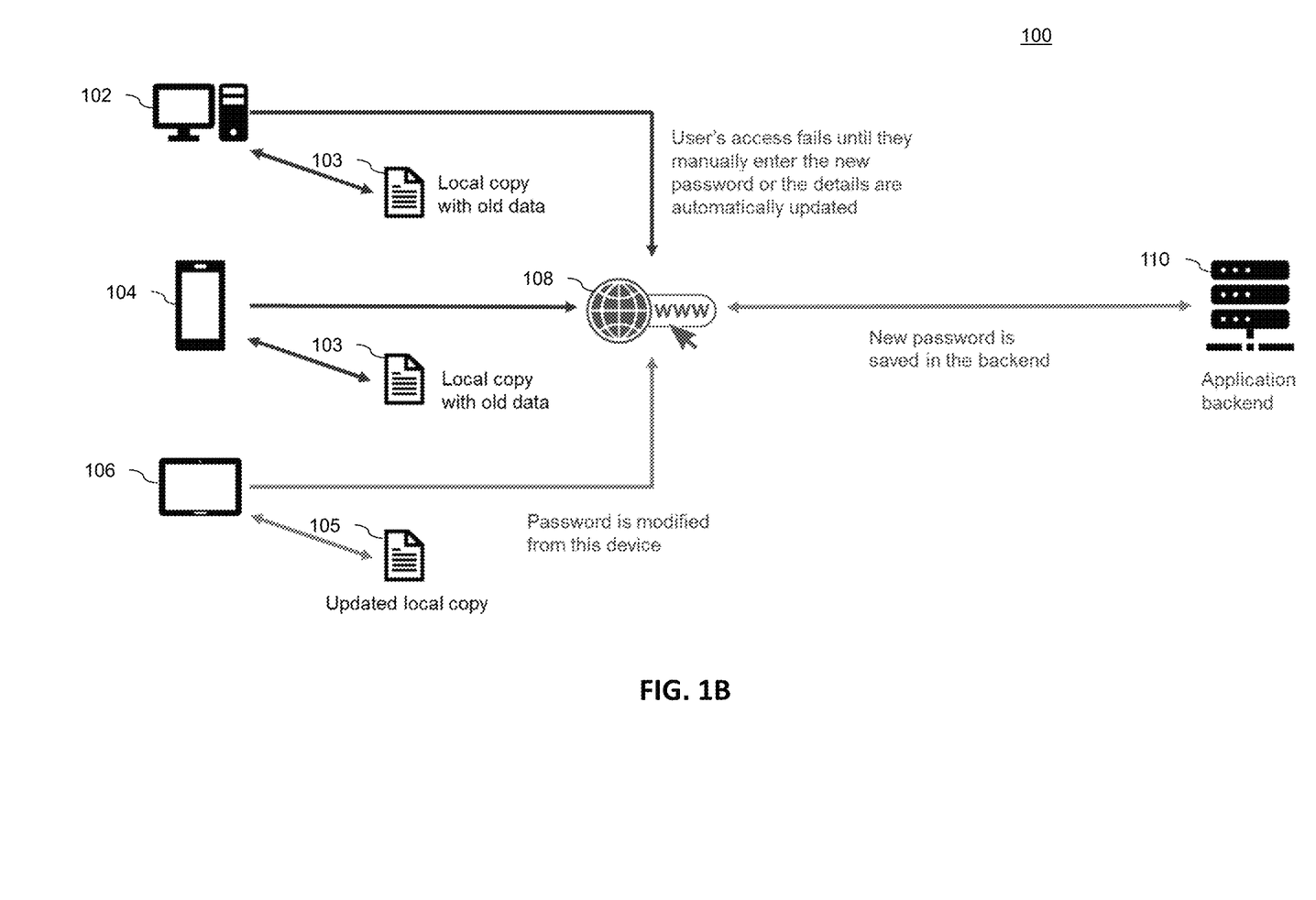

Before describing illustrative embodiments, reference is made to FIGS. 1A and 1B which depict an information processing system with existing application credential management for multiple user devices.

As shown in FIG. 1A, as part of information processing system 100, devices 102, 104 and 106 of a given user (not expressly shown) have associated therewith the same credentials 103 (local copy with current data) to access a given application via a network 108 such as the world wide web. The credentials 103 are stored in an application backend (database) 110 such that when the user submits the credentials to access the application, the application backend 110 can attempt to authenticate/authorize the user by comparing the submitted credentials against the credentials stored by the application backend 110 for that user. Thus, with matching credentials, the given user can access the given application from any of the devices 102, 104 and 106. Now in FIG. 1B, assume that at least one part of credentials 103, e.g., the password, is modified from device 106, thus creating updated credentials 105 (updated local copy). Under existing credential management techniques, the new password is saved in application backend 110, thus making the credentials 103 at devices 102 and 104 outdated (local copy with old data). As such, the user's access fails from devices 102 and 104 until the user manually enters the new password or the credentials are somehow updated in the devices 102 and 104. However, if the user himself did not change the password from device 106, rather a malicious actor made or otherwise caused the change, then the user does not know the new password and is therefore shut out of accessing the application.

As mentioned above, illustrative embodiments address the issues depicted in FIGS. 1A and 1B by providing improved management of credentials across multiple user devices that ensures security and enables automatic synchronization of credentials across the multiple user devices.

Figure 2:
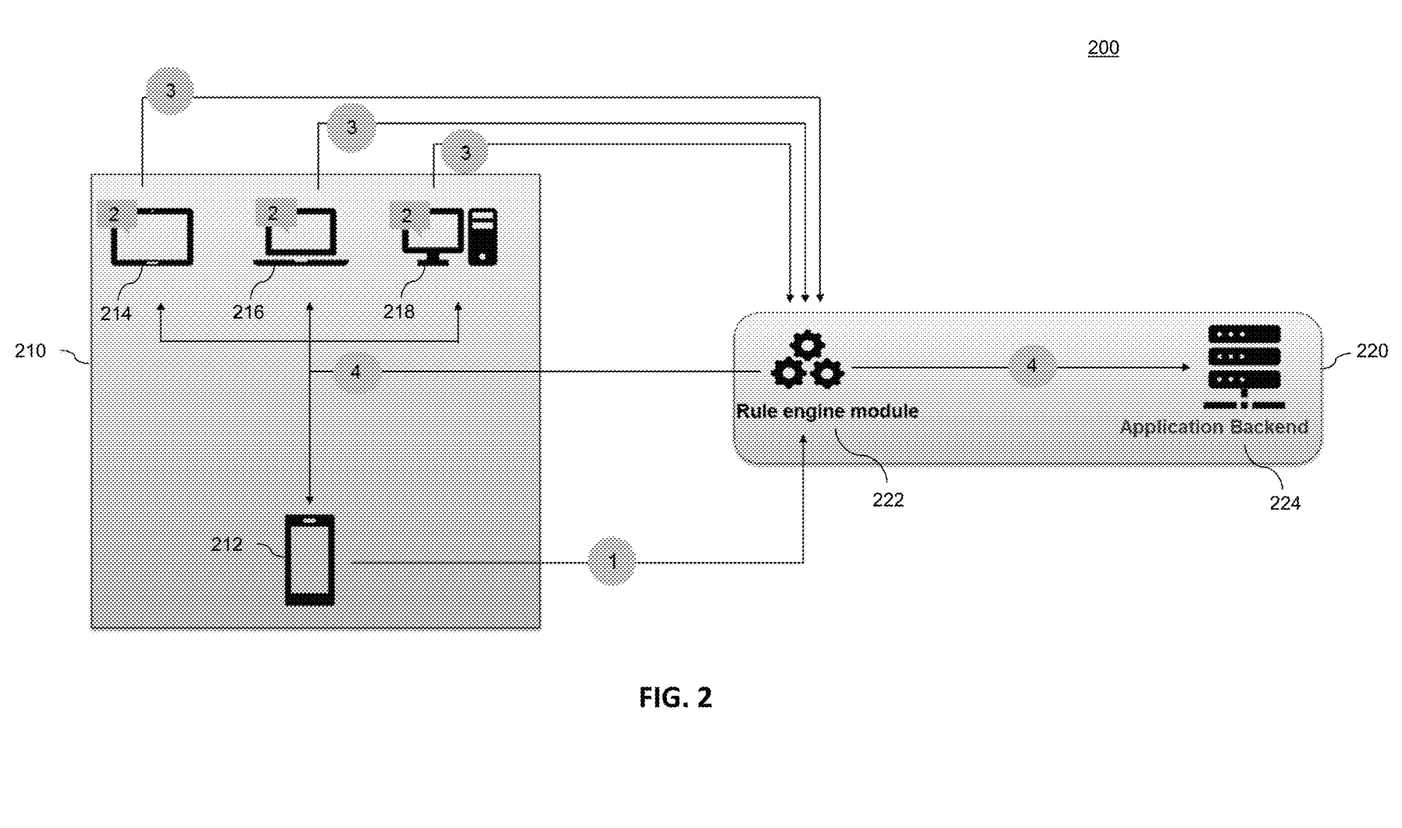
FIG. 2 depicts an information processing system with application credential management for multiple user devices, according to an illustrative embodiment.

Turning now to FIG. 2, an information processing system is depicted with application credential management for multiple user devices, according to an illustrative embodiment. As shown, information processing system 200 comprises a private blockchain network 210 to which multiple devices 212, 214, 216 and 218 of a given user (not expressly shown) belong. Also shown in information processing system 200 is an application platform 220, operatively coupled to the multiple devices 212, 214, 216 and 218 in the private blockchain network 210, that comprises a rule engine module 222 and an application backend 224. Thus, it is assumed that multiple devices 212, 214, 216 and 218 in the private blockchain network 210 are owned or otherwise managed by the given user, while the rule engine module 222 and the application backend 224 of the application platform 220 are owned or otherwise managed by an application vendor or application hosting service provider.

As will be further explained herein, one or more illustrative embodiments (e.g., FIG. 2 embodiment) use blockchain technology. Advantageously, the user can add (register) devices (e.g., 212, 214, 216 and 218) that the user will use to access a given application to a private blockchain network (e.g., 210) that is owned and controlled by the user (i.e., the reason the blockchain network is referred to as a private blockchain network). The open and consensus driven architecture of blockchain gives the user on each of the devices the ability and exclusive right to reject or accept any updates. In one or more illustrative embodiments, a rule execution set (e.g., part of 222) defined by the user is used to manage the updates. The information is updated on all the devices if and only if the criteria defined in the rule execution set is met. Further, in one or more illustrative embodiments, the system ensures that the rule execution set is secured from external threats and the user is notified of any change performed on the set by an external party.

Unlike the traditional centralized source of truth architectures, blockchain gives the control of trust to the end user. The blockchain framework ensures that there will be no other device(s) other than the registered devices in a private blockchain network. Also, the immutable characteristics of blockchain helps maintain a ledger to audit the history of events. For example, blockchain uses a key-pair for the devices to register their identity. The information is stored in the form of hashes which can be used for several identity-related attributes such as, by way of example only, an International Mobile Equipment Identity (IMEI), a unique identity number, or Media Access Control (MAC) address. Then, the device can request a recognized party to verify the hashes by authenticating that the information provided on the blockchain is true. So, whenever the user's password is required for any kind of authentication or identification mechanism, the hashes of the block pre-verified by the trusted recognized party can be used.

More particularly, in one or more illustrative embodiments (e.g., FIG. 2 embodiment), when a user modifies the password from a device, a new block is created in the private blockchain network 210 with the modified information. A hash value is assigned for the new block using the user's public key and MAC address of the device from which it was modified. The new block is also assigned a public key which enables other devices in the network to identify the new block. When all the devices or the number of devices in the network that must mandatorily approve send their approvals for the new block, the password for the application is automatically updated across all the devices in the network. The password is only then updated in the application backend 224.

It is to be appreciated that a user can configure the minimum number of devices from which approvals are required or the devices that have to mandatorily approve to validate a new block. Due to this, the user is given the freedom to prioritize devices in the private blockchain network. Advantageously, the user can automatically access the application from all the devices in the private blockchain network without the need to manually enter the new password. The user or an unknown source cannot modify the credential information from a device outside the network, as the process requires approval from the devices in the network. Thus, the user information is secured from external threats and also cannot be modified without the user being notified.

Returning to FIG. 2, one example set of steps for changing a user password comprises the following. In step 1, the password is modified from one of the devices of the user, i.e., device 212. In step 2, rule engine module 222 displays a pop-up notification on all other devices, i.e., devices 214, 216 and 218, in the private blockchain network 210 with an approve/reject option. In step 3, the user of devices 214, 216 and 218 send their approval using a response feature in the notifications. If a device does not have an active user when the notification is sent, one of the devices can provide approval on their behalf, as will be further described below in the context of FIG. 6. In step 4, rule engine module 222 evaluates the responses and updates the devices 214, 216 and 218 and application backend 224 accordingly. The notion of an "active user" in this illustrative example means that the device has no user who is using the device when the notification come in. Hence, no one will be able to approve/reject the password change using the pop-up notification feature.

Figure 3:
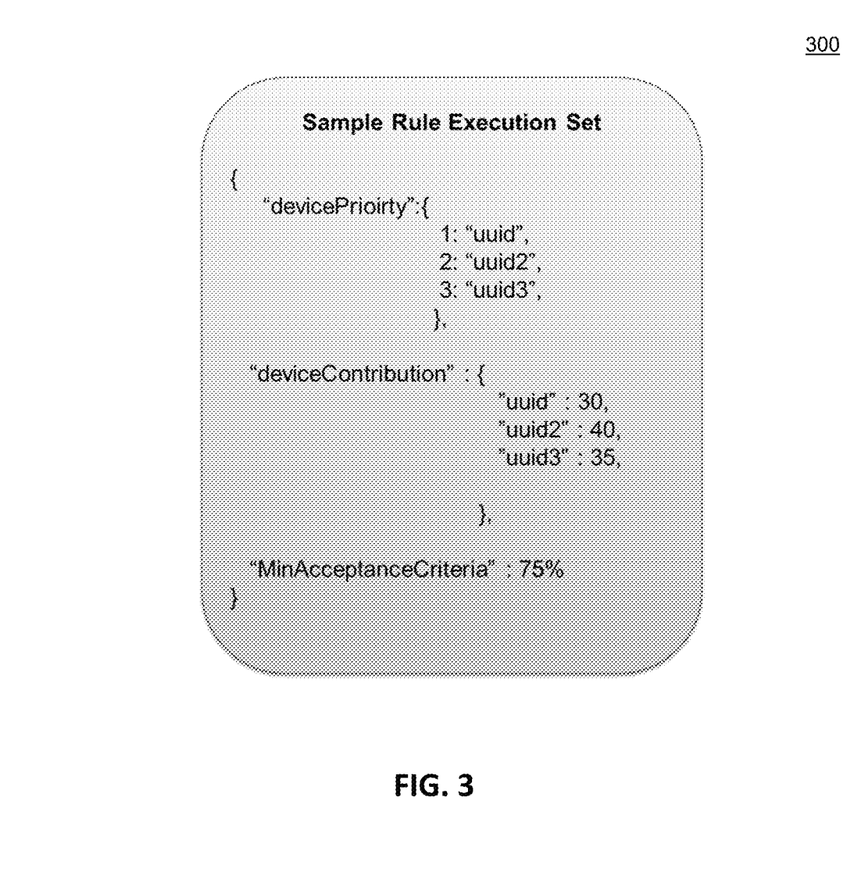
FIG. 3 depicts a rule execution set for application credential management for multiple user devices, according to an illustrative embodiment.

Turning now to FIG. 3, an example of a rule execution set 300 implemented by rule engine module 222 is shown, according to an illustrative embodiment. In one or more illustrative embodiments, rule engine module 222 is a customizable component that is provided by the application vendor to his customers. The module 222 comprises a rule execution set (e.g., 300) and a rule engine (e.g., further illustrated in FIG. 4).

In one or more illustrative embodiments, users can configure the rule execution set for their private blockchain network to specify, for example: (i) number of devices in the private blockchain network; (ii) priority of devices (e.g., 1. uuid (device with a first universal user ID); 2. uuid2 (device with a second universal user ID); and 3. uuid3 (device with a third universal user ID)); (iii) minimum number of devices that are required to provide approval for any change (e.g., minimum acceptance criteria can be 75% of all devices in the private blockchain network); (iv) frequency in which the user must be notified to change the password; and (v) a device acceptance contribution or acceptance weightage (e.g., device Contribution: uuid: 30; uuid2: 40; uuid3: 35).

With respect to weightage (device contribution), in some embodiments, each device will not have equal contribution towards the total acceptance criteria. For example, assuming three devices are added into the blockchain, not all will have equal contributions (⅓ each) into the total. Rather, the contribution (or weightage) of each device can vary such that the devices have unequal contributions. In one non-limiting example, assume that the device with uuid is set with a weightage of 30%, the device with uuid2 is set with a weightage of 40%, and the device with uuid3 is set with a weightage of 35%. If a total acceptance of 75% is required, then when uuid, uuid2 and uuiid3 all accept the change, the change is made because the weightages add up to 105% (30%+40%+35%). Likewise, when uuid2 and uuiid3 accept the change, the change is made because the weightages add up to 75% (40%+35%). However, when only uuid and uuid2 accept the change (totaling 70%) or only uuid and uuid3 accept the change (totaling 65%), the change is not made because the totals are less than the acceptance criteria of 75%. It is to be understood that this particular method of determining acceptance is merely an example and other methods for determining acceptance are contemplated to be within the scope of one or more alternative embodiments.

Further, in one or more illustrative embodiments, users can also enable or disable the following options to provide an approval on behalf of a device that does not have an active user when a notification is sent: (i) approve by entering login credentials of the device; (ii) approve using a link provided in an email notification sent by the rule engine; and/or (iii) approve by entering a one-time password (OTP) sent by the rule engine.

Figure 4:
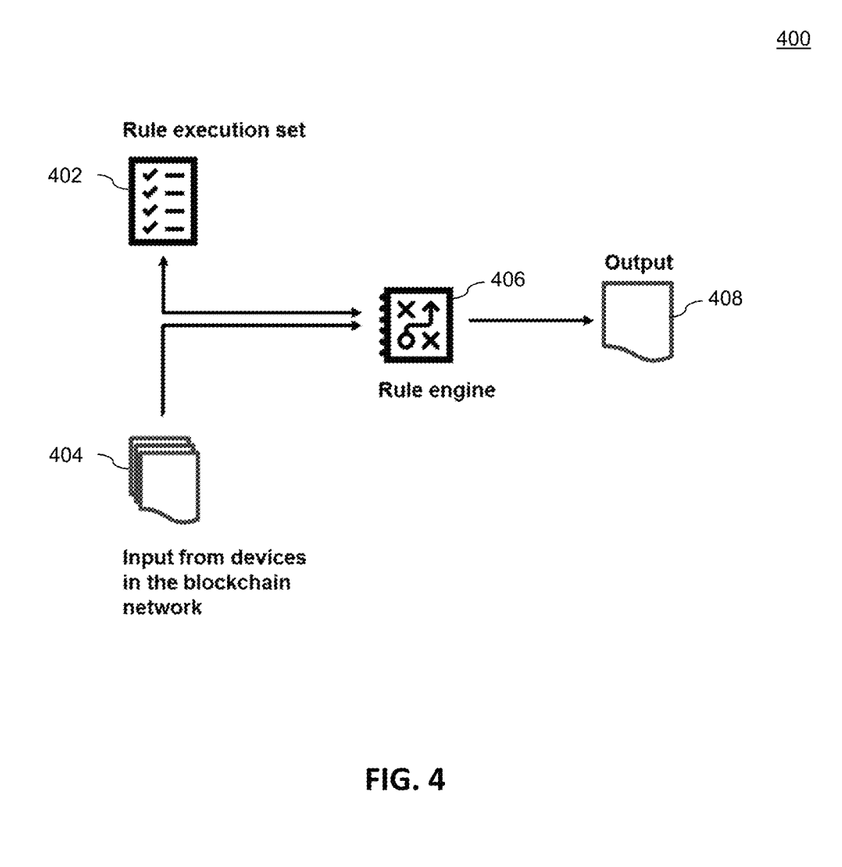
FIG. 4 depicts operation of a rule engine module for application credential management for multiple user devices, according to an illustrative embodiment.

FIG. 4 depicts operation 400 of rule engine module 222, according to an illustrative embodiment. As depicted, rule execution set 402 comprises rules defined by the user for the devices in the private blockchain network. Input from devices 404 comprises the acceptance or denial for request of approval from the devices in the private blockchain network. Rule engine 406 evaluates the inputs 404 from the devices in the private blockchain network against the defined rule execution set 402. The output 408 of the rule engine 406 is applied on the devices in the private blockchain network and also saved in the application backend.

Figure 5:
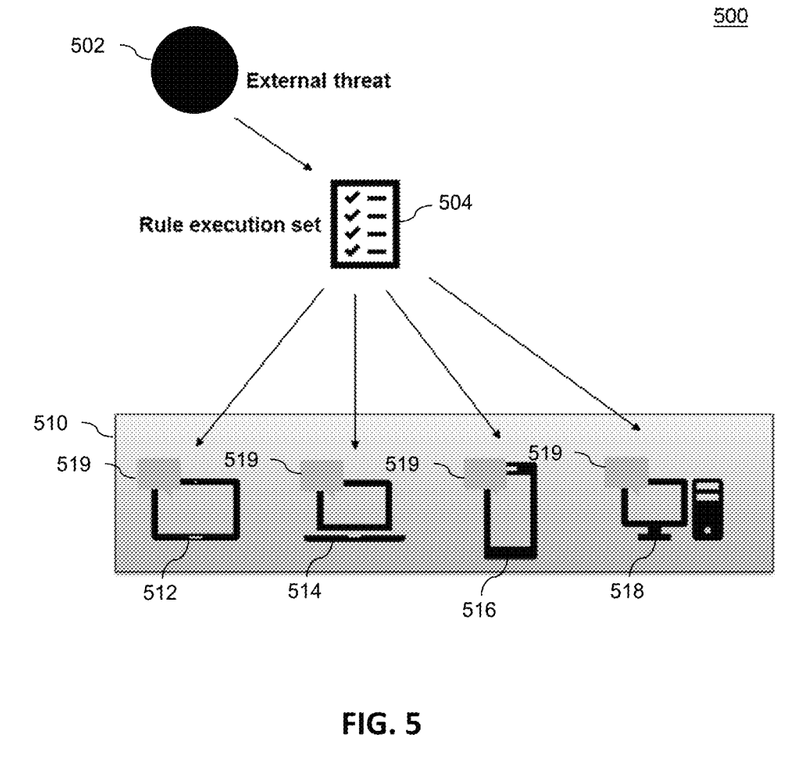
FIG. 5 depicts security of a rule engine module for application credential management for multiple user devices, according to an illustrative embodiment.

FIG. 5 depicts an example 500 of security for rule engine module 222, according to an illustrative embodiment. As shown, an external threat 502 tries to attack rule execution set 504 which is used to manage credentials of multiple user devices 512, 514, 516 and 518 in a private blockchain network 510. Though the rule engine module 222 is secured by the application vendor along with the application backend (e.g., application platform 220 in FIG. 2), its vulnerability to security threats cannot be ignored. To address this issue, one or more illustrative embodiments give the users the control to validate any changes in the rule execution set 504. For example, any change in the configuration defined in the rule execution set 504 must be approved from all the devices 512, 514, 516 and 518 in the private blockchain network 510. This ensures that, if any modification to the configuration is initiated from an external device 502, the user is immediately notified 519 at devices 512, 514, 516 and 518.

Figure 6:
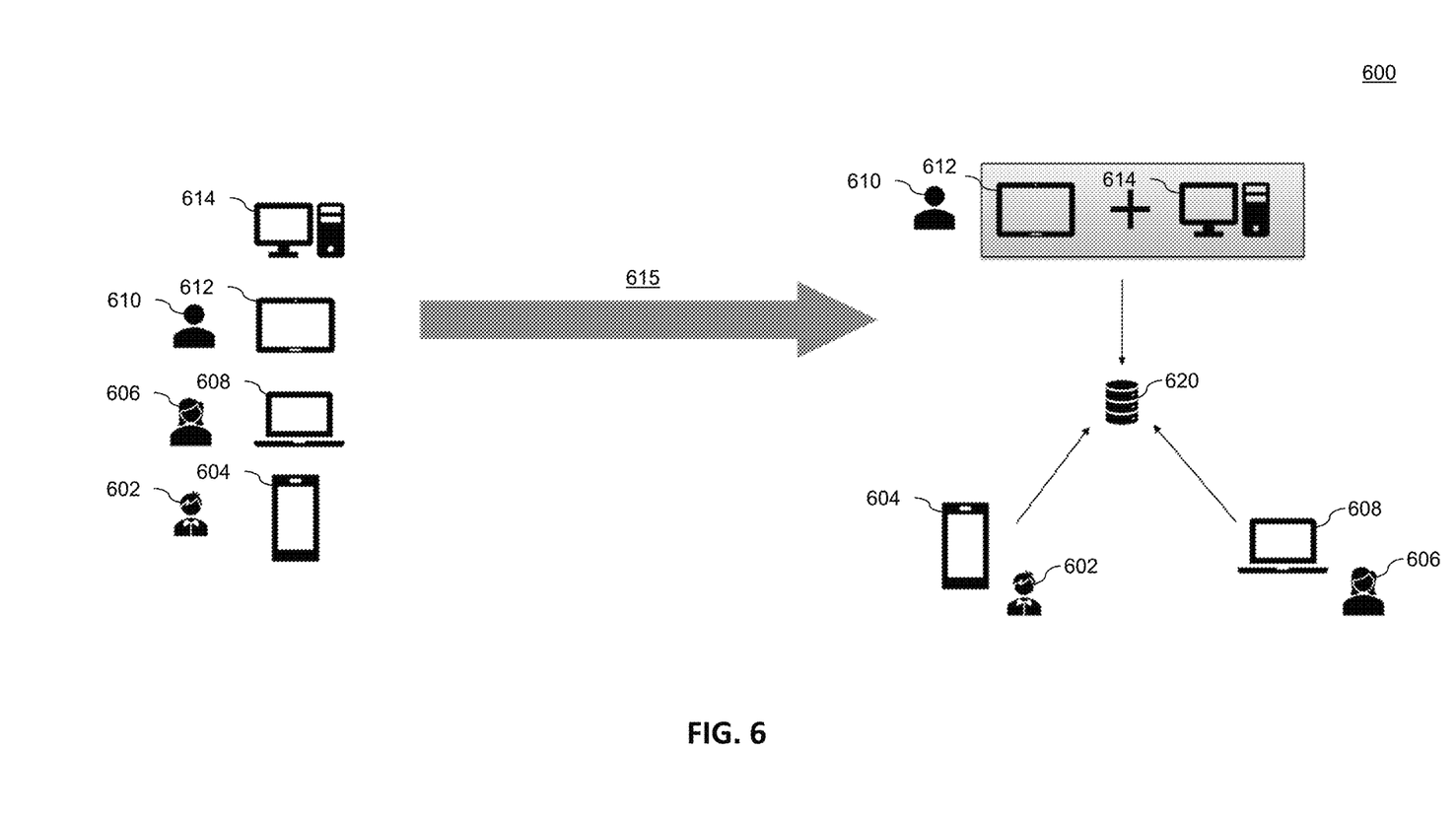
FIG. 6 depicts a scenario where a device in an information processing system with application credential management for multiple user devices has no active user, according to an illustrative embodiment.

Turning now to FIG. 6, a scenario 600 is depicted where a device in a private blockchain network for multiple user devices has no active user, according to an illustrative embodiment. As shown, assume user 602 uses device 604, user 606 uses device 608, user 610 uses device 612, but device 614 has no active user or is otherwise not accessible. Then, the initiator for the new block, e.g., user 610 on device 612, can approve on behalf of device 614 by, e.g., remotely entering (615) the login credentials of device 614. The remote login only validates the credentials entered for device 614 and does not allow application access from device 614. Other methods of approving on behalf of device 614 include using a link provided in an email notification sent by the rule engine module 620, and entering an OTP sent by the rule engine module 620. The rule engine module 620 identifies the device (614) that does not have an active user and prompts the initiator (610/612) or any other configured device to approve the request by entering the device credentials.

Advantageously, as described herein, illustrative embodiments provide a framework based on blockchain that ensures that the user's information can be modified only based on the criteria defined by the user while configuring the rule engine. The rule engine enables the user to define device priority, weightage (as explained above) of each device in the network, and minimum acceptance criteria for a modification in his information. Further, the framework eliminates use cases wherein a third party (hacker) modifies user information by simply accessing the application. This approach rules out cases of Single Point of Failure (SPOF) for applications accessed from multiple devices. Still further, the approach eliminates use cases wherein a third party (hacker) changes the user information using any device.

Illustrative embodiments ensure that user information cannot be modified from devices outside the user network. Any applications where a portal is accessed from multiple devices where the same account is used while logging in from the different devices would benefit from this approach by eliminating a single point of control of information. Illustrative embodiments also: (i) eliminate a user's dependency on third party vendors to secure personal information; (ii) provide complete control to a user over their personal information, for example, account credentials; (iii) provide a closely connected network of devices that can interface with each other through a common platform to ensure data security; (iv) ensure that a user's information can never be modified from any device outside the network without their knowledge; and (v) eliminate the risk of packet sniffing or data hacking as both users and vendors are assured that data packets will never travel outside their private network without their approval.

Figure 7:
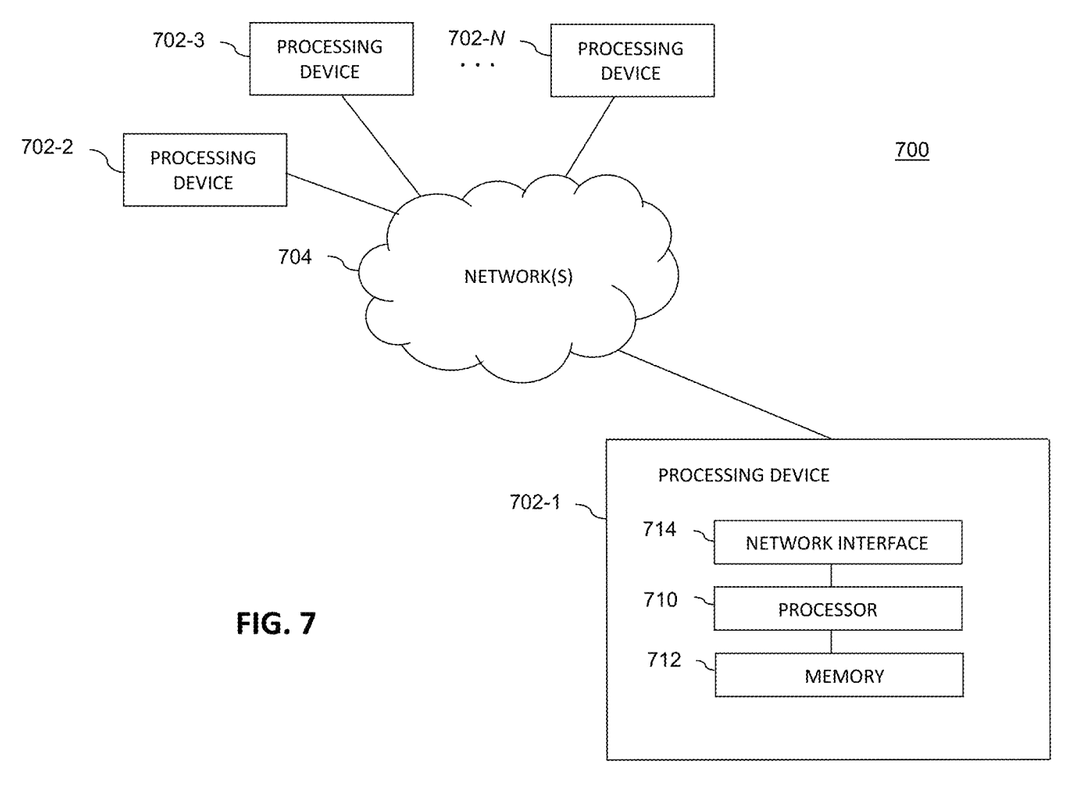
FIG. 7 depicts a processing platform used to implement an information processing system with application credential management for multiple user devices, according to an illustrative embodiment.

FIG. 7 depicts a processing platform 700 used to implement an information processing system with application credential management for multiple user devices, according to an illustrative embodiment. More particularly, processing platform 700 is a processing platform on which a computing environment with functionalities described herein (e.g., FIGS. 1-6 and otherwise described herein) can be implemented.

The processing platform 700 in this embodiment comprises a plurality of processing devices, denoted 702-1, 702-2, 702-3, . . . 702-N, which communicate with one another over network(s) 704. It is to be appreciated that the methodologies described herein may be executed in one such processing device 702, or executed in a distributed manner across two or more such processing devices 702. It is to be further appreciated that a server, a client device, a computing device or any other processing platform element may be viewed as an example of what is more generally referred to herein as a "processing device." As illustrated in FIG. 7, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 702 shown in FIG. 7. The network(s) 704 represent one or more communications networks that enable components to communicate and to transfer data therebetween, as well as to perform other functionalities described herein.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 710. Memory 712 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 712 may comprise electronic memory such as random-access memory (RAM), read-only memory (ROM) or other types of memory, in any combination. The one or more software programs when executed by a processing device such as the processing device 702-1 causes the device to perform functions associated with one or more of the components/steps of system/methodologies in FIGS. 1-6. One skilled in the art would be readily able to implement such software given the teachings provided herein. Other examples of processor-readable storage media embodying embodiments of the invention may include, for example, optical or magnetic disks.

Processing device 702-1 also includes network interface circuitry 714, which is used to interface the device with the networks 704 and other system components. Such circuitry may comprise conventional transceivers of a type well known in the art.

The other processing devices 702 (702-2, 702-3, . . . 702-N) of the processing platform 700 are assumed to be configured in a manner similar to that shown for computing device 702-1 in the figure.

The processing platform 700 shown in FIG. 7 may comprise additional known components such as batch processing systems, parallel processing systems, physical machines, virtual machines, virtual switches, storage volumes, etc. Again, the particular processing platform shown in this figure is presented by way of example only, and the system shown as 700 in FIG. 7 may include additional or alternative processing platforms, as well as numerous distinct processing platforms in any combination.

Also, numerous other arrangements of servers, clients, computers, storage devices or other components are possible in processing platform 700. Such components can communicate with other elements of the processing platform 700 over any type of network, such as a wide area network (WAN), a local area network (LAN), a satellite network, a telephone or cable network, or various portions or combinations of these and other types of networks.

Furthermore, it is to be appreciated that the processing platform 700 of FIG. 7 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 700 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-7 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
obtaining an indication of a proposed modification of an access credential, the proposed modification being generated at a device of a set of two or more devices that are part of a secure private network, wherein the access credential is commonly used by the set of two or more devices;
causing notification of the proposed modification of the access credential to be presented to other devices of the set of two or more devices;
obtaining an acceptance or a rejection of the proposed modification from at least a subset of the other devices of the set of two or more devices; and
causing the access credential to be modified for each device of the set of two or more devices when the proposed modification of the access credential is accepted by at least the subset of the other devices of the set of two or more devices;
wherein the steps are performed by a processing device comprising a processor operatively coupled to a memory.

2. The method of claim 1, wherein the secure private network comprises a blockchain network such that each device of the set of two or more devices correspond to a node of the blockchain network.

3. The method of claim 2, wherein one or more of indications, proposed modifications, acceptances, rejections and modifications are securely stored and accessible as blocks via the blockchain network.

4. The method of claim 1, wherein acceptance and rejection of the proposed modification of the access credential is based on a rule set.

5. The method of claim 4, wherein the rule set comprises one or more of:
a rule specifying a maximum number of devices permitted in the secure private network;
a rule specifying a priority with respect to the set of two or more devices in the secure private network;
a rule specifying one or more acceptance criteria for when the proposed modification of the access credential is accepted; and
a rule specifying a frequency limit associated with modification of the access credential.

6. The method of claim 5, wherein the one or more acceptance criteria comprises assigning an acceptance weightage value to each device in the set of two or more devices.

7. The method of claim 6, wherein the acceptance weightage of at least one of the devices is different than the acceptance weightage of at least another of the devices.

8. The method of claim 4, wherein the rule set is configurable to allow limited acceptance by a first device in the set of two or more devices that has an active user on behalf of a second device in the set of two or more devices that has no active user by one or more of: entering a login credential of the second device; using a link provided in an email notification; and entering a one-time password.

9. The method of claim 4, wherein the rule set is configured to be modifiable based on approval of at least a subset of the set of two or more devices.

10. The method of claim 1, wherein the access credential is commonly used by the set of two or more devices to gain access to one of an application, a service and a system.

11. The method of claim 10, wherein the step of causing the access credential to be modified further comprises updating the set of two or more devices and the one of an application, a service and a system with the modified access credential.

12. An apparatus comprising:
a processing device having a processor operatively coupled to a memory and configured to:
obtain an indication of a proposed modification of an access credential, the proposed modification being generated at a device of a set of two or more devices that are part of a secure private network, wherein the access credential is commonly used by the set of two or more devices;
cause notification of the proposed modification of the access credential to be presented to other devices of the set of two or more devices;
obtain an acceptance or a rejection of the proposed modification from at least a subset of the other devices of the set of two or more devices; and
cause the access credential to be modified for each device of the set of two or more devices when the proposed modification of the access credential is accepted by at least the subset of the other devices of the set of two or more devices.

13. The apparatus of claim 12, wherein the secure private network comprises a blockchain network such that each device of the set of two or more devices correspond to a node of the blockchain network.

14. The apparatus of claim 12, wherein the processing device is further configured to accept and reject the proposed modification of the access credential based on a rule set.

15. The apparatus of claim 14, wherein the rule set comprises one or more of:
   a rule specifying a maximum number of devices permitted in the secure private network;
   a rule specifying a priority with respect to the set of two or more devices in the secure private network;
   a rule specifying one or more acceptance criteria for when the proposed modification of the access credential is accepted; and
   a rule specifying a frequency limit associated with modification of the access credential.

16. The apparatus of claim 14, wherein the rule set is configurable to allow limited acceptance by a first device in the set of two or more devices that has an active user on behalf of a second device in the set of two or more devices that has no active user by one or more of: entering a login credential of the second device; using a link provided in an email notification; and entering a one-time password.

17. An article of manufacture comprising a non-transitory processor-readable storage medium having stored therein program code of one or more software programs, wherein the program code when executed by at least one processing device causes the at least one processing device to perform steps of:
   obtaining an indication of a proposed modification of an access credential, the proposed modification being generated at a device of a set of two or more devices that are part of a secure private network, wherein the access credential is commonly used by the set of two or more devices;
   causing notification of the proposed modification of the access credential to be presented to other devices of the set of two or more devices;
   obtaining an acceptance or a rejection of the proposed modification from at least a subset of the other devices of the set of two or more devices; and
   causing the access credential to be modified for each device of the set of two or more devices when the proposed modification of the access credential is accepted by at least the subset of the other devices of the set of two or more devices.

18. The article of claim 17, wherein the at least one processing device is further configured to perform the step of:
   accepting and rejecting the proposed modification of the access credential based on a rule set.

19. The article of claim 18, wherein the rule set comprises one or more of:
   a rule specifying a maximum number of devices permitted in the secure private network;
   a rule specifying a priority with respect to the set of two or more devices in the secure private network;
   a rule specifying one or more acceptance criteria for when the proposed modification of the access credential is accepted; and
   a rule specifying a frequency limit associated with modification of the access credential.

20. The article of claim 18, wherein the rule set is configurable to allow limited acceptance by a first device in the set of two or more devices that has an active user on behalf of a second device in the set of two or more devices that has no active user by one or more of: entering a login credential of the second device; using a link provided in an email notification; and entering a one-time password.

* * * * *